(12) United States Patent
Gadkaree et al.

(10) Patent No.: US 7,297,299 B2
(45) Date of Patent: Nov. 20, 2007

(54) COMPOSITION AND METHOD FOR MAKING CERAMIC FILTERS

(75) Inventors: Kishor P. Gadkaree, Big Flats, NY (US); Joseph F. Mach, Lindley, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/398,021

(22) Filed: Apr. 4, 2006

(65) Prior Publication Data

US 2006/0178258 A1   Aug. 10, 2006

(51) Int. Cl.
*E04B 1/16* (2006.01)

(52) U.S. Cl. .......................... 264/34; 264/267; 264/273

(58) Field of Classification Search ................ 264/400, 264/40.1, 34, 267, 273
See application file for complete search history.

(56) References Cited

U.S. PATENT DOCUMENTS

| | | | |
|---|---|---|---|
| 1,606,481 A | 11/1926 | Rochow | 601/128 |
| 4,293,357 A | 10/1981 | Higuchi et al. | 156/89 |
| 4,297,140 A | 10/1981 | Paisley | 428/310 |
| 4,340,403 A | 7/1982 | Higuchi et al. | 55/523 |
| 4,364,760 A | 12/1982 | Higuchi et al. | 55/523 |
| 4,411,856 A | 10/1983 | Montierth | 264/267 |
| 4,886,769 A * | 12/1989 | Kuma et al. | 502/62 |
| 4,921,536 A | 5/1990 | Rechter | |
| 4,950,627 A | 8/1990 | Tokarz et al. | 501/95 |
| 5,238,518 A * | 8/1993 | Okubi et al. | 156/326 |
| 5,332,432 A | 7/1994 | Okubi et al. | 106/626 |
| 5,466,280 A * | 11/1995 | Lee et al. | 106/14.12 |
| 6,428,616 B1 * | 8/2002 | Neely, Jr. | 106/628 |
| 6,464,774 B1 | 10/2002 | Satoh | 106/600 |
| 6,589,661 B2 | 7/2003 | Neely, Jr. | 428/457 |

FOREIGN PATENT DOCUMENTS

| | | | |
|---|---|---|---|
| CZ | 291443 | | 3/2003 |
| EP | 0 043 694 | | 2/1986 |
| GB | 2286977 | | 9/1995 |
| JP | 53033990 | * | 3/1978 |
| JP | 57088084 | | 6/1982 |
| JP | 57176109 | | 10/1982 |
| JP | 58081419 | | 5/1983 |
| JP | 60235619 | * | 11/1985 |
| JP | 62046980 | * | 2/1987 |
| JP | 63256576 | | 10/1988 |
| JP | 02144153 | * | 6/1990 |
| JP | 03192176 | | 8/1991 |
| JP | 05057825 | * | 3/1993 |
| JP | 08001839 | * | 1/1996 |
| JP | 2001019733 | * | 1/2001 |
| KR | 2002058174 | | 7/2002 |

* cited by examiner

*Primary Examiner*—Paul Marcantoni
(74) *Attorney, Agent, or Firm*—Joseph M. Homa; Kees van der Sterre

(57) ABSTRACT

The channel-plugging of porous ceramic honeycombs to provide wall flow filter bodies therefrom is carried out using water-based cements comprising ceramic powders and soluble alkali metal silicates; the cements form durable plugs that are resistant to thermal and chemical damage upon drying and without firing.

20 Claims, No Drawings

COMPOSITION AND METHOD FOR MAKING CERAMIC FILTERS

BACKGROUND OF THE INVENTION

The present invention relates to ceramic honeycomb filters of wall-flow design, and more particularly to materials and methods for plugging or manifolding such filters as required to provide for the effective wall flow filtration of particulate-laden gases flowing therethrough.

Honeycomb structures formed from ceramic materials have a number of important uses including use as catalyst supports for controlling emissions from combustion engines and stationary pollutions sources such as power plants. They are also used as porous particulate filter bodies for the filtration of particulate-laden exhaust gases emitted by combustion engines such as diesel engines. In the latter case, the bodies are modified through the sealing or plugging of the ends of selected cells of the honeycombs to provide a manifolded "wall-flow" filter structure. The terms "sealed" and "sealing" as used herein refer to both porous and non porous means of closing selected open transverse cross-sectional areas of cells.

In current practice, the fabrication of such filters involves plugging or otherwise sealing one end of each of the channels or cells traversing a porous ceramic honeycomb body, a first subset of cells being sealed at a first or inlet end face of the honeycomb and the remaining cells being sealed at a second or opposing outlet end face thereof. A particulate-contaminated fluid such as an exhaust gas is supplied under pressure to the inlet face and enters the body via those cells which have an open end at the inlet face (i.e., "inlet" cells). Because these cells are sealed at the opposite end face ("outlet" face) of the body, the contaminated fluid is forced through the thin, porous walls into adjoining cells which are sealed at the inlet face and open at the outlet face (i.e., "outlet" cells). The solid particulate contaminant in the fluid which is too large to pass through the porous openings in the walls is left behind and a cleansed fluid exits the filter body through the outlet cells for use.

Most common in the case of honeycombs with square channel cross-sections is a masking design producing a checkerboard pattern of plugs in each end of the honeycombs, such that each inlet cell is surrounded on four sides by outlet cells, and vice versa. Examples of such filter bodies and other wall-flow filter designs that have been developed for these uses, are disclosed, for example, in European Patent No. 0 043 694.

For the mass production of plugged wall flow filters it is highly desirable to be able to seal selected cell ends as rapidly and as inexpensively as possible. The hand-plugging if individual cells is long and tedious and is not suited for the commercial production of such filters. Accordingly numerous approaches to simplify and speed the plugging operation have been developed. One such approach, disclosed in U.S. Pat. No. 5,021,204, involves the use of a rigid solid masking plate having a number of openings or bores extending therethrough for directing suitable plugging materials into the ends of the channels to be plugged.

Many alternative masking approaches employing flexible polymeric masks or masking strips of impermeable and/or re-useable materials have also been proposed. U.S. Pat. No. 4,411,856 provides some examples. Further, a wide variety of compositions for the plugging materials to be used in these processes is known, including the foamed cement plugging materials disclosed in U.S. Pat. No. 4,297,140.

A common disadvantage of most of the plugging processes and materials developed to date is that they cannot successfully be applied to ceramic honeycombs that have not been fired or otherwise processed to develop high wall strength. Thus many of the known plugging processes and materials are suitable only for application to pre-fired honeycombs, and further require a second firing treatment following the introduction of the plugging materials to cure and bond the plugs firmly into the honeycomb structure. These extra firing steps add significant cost to the filter manufacturing process.

Another disadvantage of many of the known plugging formulations is that they require the application of significant extraneous heat or other energy in order to achieve sufficient adherence and strength to withstand further handling in the course of manufacture. So-called "cold set" plugging cements that would form a durable mechanical seal without additional processing have not been widely developed or used. Further, some cold set cements that have been proposed for use employ ceramic fiber additives for the purpose of plug reinforcement, and such additives are generally to be avoided for environmental reasons.

Finally, any sealing system to be used for the manifolding of ceramic honeycomb filter bodies must exhibit chemical and physical stability sufficient to withstand extended use under the conditions encountered by the filter bodies in use. These conditions include high temperatures and chemical reactive environments.

SUMMARY OF THE INVENTION

The present invention provides novel ceramic sealing or cementing compositions and methods for using them that have particular utility for the plugging of porous ceramic honeycomb filter bodies. The cement compositions of the invention offer good forming and wetting characteristics, yet will solidify upon drying to form plugs that are intimately sealed to the channel walls of porous ceramic honeycombs of the kinds presently favored for the manufacture of such filter bodies. Post-firing of the plugs to solidify and seal them to the honeycomb structure is not required.

The cement compositions of the invention are plastically shapeable blends of ceramic powder, water water-soluble alkali metal silicates, and water. The ceramic powders are selected for compatibility with the ceramic honeycombs to be plugged. That is, they are selected to provide chemical and physical characteristics, such as resistance to moisture at high temperatures and thermal expansion characteristics, that are similar to those of the honeycombs to be plugged.

The alkali metal silicate and water components of the cementing compositions act together to form a dual purpose vehicle and binder system, plasticizing the cements when wet and rigidifying and stabilizing the cements after drying. Commercially available alkali metal silicate solutions provide a convenient way to efficiently compound and use cement batches containing these constituents.

The dried cements are sufficiently strong and durable that neither fiber reinforcement materials nor other additional components need to be included in the compositions to enhance plug properties. However, additions of other water-soluble or insoluble constituents to these cementing compositions can be made where needed to modify the physical properties or chemistry of the plugs for specific applications.

The cementing compositions of the invention enable a simplified plugging procedure for the manufacture of ceramic wall flow filters. The cements can simply be distributed into selected channels of the porous ceramic honeycombs to be processed, and thereafter easily dried to form the final plugs. The plasticized cements are generally compatible with known masking and channel-filling processes and equipment that have been employed for the plugging of ceramic honeycombs with conventional plugging compounds.

Firing of the plugged honeycombs after drying of the cement is possible, and may be preferred or even required where the cements are used to plug green (dried but unfired) honeycombs. One advantage of these cement compositions is that their handling, forming, and drying characteristics, as well as their chemical and physical behavior upon firing, are such as to make them a preferred plugging material for the processing of unfired honeycombs. Neither the strength nor the integrity and sealing characteristics of plugs formed from these cement compositions appear to be adversely affected by low to moderate temperature firing treatments.

DETAILED DESCRIPTION

A variety of different ceramic materials have been used for the fabrication of porous ceramic honeycombs. Variations in material composition as well as variations in channel wall porosity, thickness and pore size are used by filter designers to control filtration efficiency and pressure drop across the filters. Examples of materials which have been used for such filters include silicon carbide, silicon nitride, aluminum titanate, cordierite (magnesium aluminosilicate), and various other porous silicate and aluminosilicate ceramic compositions.

Regardless of the particular honeycomb material selected, it is essential that arrays of channels in the honeycombs be durably and effectively plugged to ensure that the filters perform their primary function of wall flow filtration. The plugs may be porous or non-porous, but they should not be a source of leaks permitting particulate material to by-pass the filters, and they should be sufficiently strong and chemically durable to resist displacement under the high temperatures, stresses and vibrations encountered in the course of engine exhaust system operation.

As previously noted, it is conventional practice to fire ceramic honeycombs to be used for filter fabrication to high temperatures prior to plugging, so that the honeycombs are strong enough to withstand the plugging process. The fired filters are then plugged with a cement, typically of a clay composition chemically similar to the composition of the fired honeycombs, but then must be re-fired to cure and bond the plugs into the channels.

Depending upon the particular compositions of the honeycombs and plugging cements selected for use, longer or shorter plugs and higher or lower firing temperatures must be used to develop the required plug durability. Where the bond strength between the selected plugging cement and the honeycomb walls is relatively low, deeper (longer) plugs must be used to increase the plug-honeycomb bonding area and reach adequate plug retention strength. Longer plugs are of course undesirable to the extent that they decrease the available wall flow area and thereby increase filter pressure drop. Longer and/or higher temperature cement sealing heat treatments are of course undesirable for the reasons already mentioned.

The cement formulations of the invention are particularly advantageous because they can in many cases be compositionally adjusted to match the compositions and properties of many of the ceramics already found useful for the manufacture of porous honeycomb filter substrates. Further, the cements offer good setting characteristics at room temperatures, and form bonds with many of these ceramics that are sufficiently strong even at modest plug lengths to be put into use without a second firing treatment to increase plug bond strength. And finally, plugs formed from these compositions exhibit good plug integrity even in the absence of strengthening additions of fibrous reinforcement materials. In particular, they resist the high temperature strength deterioration that is known to occur with some conventional cold setting cement compositions either through second firings or as the result of thermal spikes that can be experienced by these filters in the course of use.

Among the water-soluble silicate binder components useful in accordance with the invention are any of the commercially available water-soluble alkali metal silicates, these conveniently being available as powdered or flaked solids, or dissolved with water in the form of alkali metal silicate solutions of various concentrations and viscosities. Examples of such solutions include standardized solutions of water-soluble sodium and potassium silicates, including solutions such as the Kasil® series of potassium silicate solutions and the A®, N® and O® series of sodium silicate solutions commercially available from the PQ Corporation, Valley Forge, Pa., USA. These products are sold in various solution viscosities and also various ratios of $SiO_2$/alkali oxide, the Kasil® series of products, for example, being available in $SiO_2/K_2O$ ratios ranging from 1.6 to 2.5. Accordingly the plasticity of the plugging cement compositions can readily be adjusted by adjusting the relative proportions of alkali silicate and ceramic components to be included in the cement formulation as preferred to achieve good plugging characteristics in the final ceramic powder/silicate/water blend.

The ceramic component of the plugging formulation will be selected so that it is compatible with the composition and properties of the ceramic honeycombs to be plugged, as well effective to secure the properties targeted for the cured plugs. In the case of cordierite (magnesium aluminosilicate) ceramic honeycombs, for example, the ceramic component may suitably comprise powdered cordierite material, or it may include clay, talc, and/or alumina powders or powder mixtures that can convert to cordierite or cordierite-compatible ceramic phases upon firing. The latter mixtures may be preferred for the plugging of green (unfired) honeycombs, as conversion of the plugging material to cordierite or cordierite-compatible phases such as alumina or spinel can conveniently occur concurrently with the development of cordierite ceramic phases in the plugged honeycomb during the firing process. Similarly, for the plugging of silicon carbide, silicon nitride, or aluminum titanate honeycombs, powders of the silicon carbide, silicon nitride or aluminum titanate ceramic materials used to form the honeycombs can comprise the ceramic component of the plugging cement.

As the applications for the plugged wall-flow filters are generally high-temperature applications, thermally stable honeycombs and plugging cements are typically required. For that reason, potassium silicate solutions are normally preferable to sodium silicates because potassium ions exhibit lower mobility than sodium ions at equivalent temperatures. However either alkali formulation offers a cementing composition that will dry efficiently to form strong well-bonded plugs without supplemental firing.

Alkali ion selection is less important in cases where the option to extract alkali from the plugs is exercised. Thus, one process modification that is useful in carrying out plugging in accordance with the invention is to subject the plugged honeycomb to an ion-exchange treatment to extract alkali ions from the plugs. This step can be accomplished by immersion of the plugged honeycomb into a suitable ion-exchange medium, such as an aqueous ammonia solution, to extract alkali from the plugs and leave only a silica-bound ceramic plugging material after drying. Again, this processing can be carried out at ambient temperatures and minimal cost, as the need to perform a firing treatment to set the plugs is still avoided.

An alternative to the use of an ion-exchange treatment to reduce plug alkali content is the option of including reactive salts of multivalent cations, such as calcium, aluminum, manganese, magnesium, iron, zinc, nickel, chromium, copper or the like in the cementing formulation. These salts can react with the binder or ceramic components of the cements to form additional chemically resistant compounds. Such reactions can occur and such compounds can form either in the course of a post-plugging firing treatment or in the course of subsequent use of the filter.

Other additives to these cementing formulations can include conventional cementing materials such as the calcium aluminates which can react with a variety of ceramic powders upon heating to form strong, chemically resistant cementing phases. In all cases, however, it is important to include proportions of the base ceramic powder components that are sufficient to insure that the dried plug remains thermally and chemically compatible with the ceramic material forming the honeycomb. The inclusion of additives in proportions that can introduce thermal stresses or objectionably increase the reactivity of the plugging material is to be avoided, such damaging proportions however being readily identifiable through routine experimentation.

The invention may be further understood by reference to the following representative examples, which are intended to be illustrative rather than limiting.

EXAMPLE 1

Cordierite-Potassium Silicate Cement

A cordierite plugging cement suitable for the manifolding of porous cordierite honeycomb bodies is first prepared. To formulate such a cement, a quantity of powdered cordierite ceramic resulting from the reaction-sintering of a clay-talc-alumina mixture is classified to provide a powder feed of 10 µm average particle size. A quantity of this cordierite powder is then added to a container of Kasil® 1 potassium silicate solution, a 29.1% (weight) aqueous solution of a potassium silicate having a 2.5:1 $SiO_2:K_2O$ weight ratio that is commercially available from the PQ Corporation, Valley Forge, Pa., USA. The ceramic powder is thoroughly mixed with that silicate to form a viscous paste cement comprising 60% by weight of cordierite powder and the remainder potassium silicate solution by weight.

The paste thus provided is next charged through a mask into alternate channels of a cordierite ceramic honeycomb having a cell density of 100 cells/in$^2$ and a channel wall thickness of about 17 mils, the mask producing a checkerboard pattern of alternate channels plugged by the cement across the face of the honeycomb. The paste thus applied is then allowed to dry under ambient conditions, resulting in strong, hard cement plugs free of cracking and showing no sign of separation from, or damage to, the channel walls of the honeycomb.

For the purpose of evaluating the stability of the plugs thus provided, the entire plugged honeycomb is heated to a temperature of 1000° C. in air, cooled to ambient temperature, and re-examined. The strength and hardness of the cement plugs are unaffected by this heat treatment, nor is any separation, cracking or other damage to the plugs or surrounding honeycomb structure observed.

To further evaluate the chemical stability of cement plugs provided from this composition, a set of plugged honeycomb samples fired to 1000° C. and a second set of samples incorporating dried but unfired plugs are subjected to acid leaching in aqueous 0.01 N nitric acid solutions for 24 hours. Neither the dried plugs nor the dried and fired plugs are adversely affected by the acid treatment.

EXAMPLE 2

Comparative Strength Testing

The thermal stability of the plugging cement of Example 1 is evaluated by comparing the strengths of new and heat-treated cement samples formulated as in that Example with samples made from a conventional plugging cement. The tests are carried out on MOR (modulus of rupture) strength testing bars of the two cements, by stressing the bars to breakage under 4-point bending stress.

The conventional plugging cement employed for testing has a base composition consisting, in weight percent, of about 66% cordierite powder, 26.8% Fiberfrax® QF-180 ceramic fiber reinforcement, 6.4% Ludox® colloidal silica binder, and 0.8% of a methyl cellulose temporary binder. A water vehicle is blended into this mixture in a proportion of about 26.8 parts water for each 100 parts cement mix by weight. All MOR tests are carried out at an ambient temperature of 25° C.

Representative results for such tests are reported in Table A below.

TABLE A

Thermal Durability Tests

| Cement Composition | Heat Treatment Temperature | M.O.R.- kPa (Psi) |
| --- | --- | --- |
| Standard (Ludox) cement | none | 2158 kPa (313 ± 40 psi) |
| " | 500° C. | 462 kPa (67 ± 20 psi) |
| " | 1000° C. | 2137 kPa (310 ± 10 psi) |
| Example 1 cement | none | 12514 kPa (1815 ± 200 psi) |
| " | 500° | 11321 kPa (1642 ± 95 psi) |
| " | 1000° C. | 12066 kPa (1750 ± 100 psi) |

The significantly higher strengths of the Example 1 cements, both before and after heat treatment, are evident from the data in Table A. Particularly important is the capability of the Example 1 cements to avoid the large reductions in strength observed for the conventional cements at intermediate heating temperatures. The several-fold increase in cement strength observed to result from the use of the Example 1 composition will not only increase the durability of the plugs but will also permit the use of shorter plugs having a reduced impact on the wall flow filtration area of the filters.

EXAMPLE 3

Cordierite-Sodium Silicate Cement

The cement compounding, plugging, drying, and firing procedures of Example 1 are repeated, except that the Kasil® potassium silicate solution of Example 1 is replaced by a sodium silicate solution. The sodium silicate solution used is N® sodium silicate solution commercially available from the PQ Corporation, Valley Forge, Pa., a 37.5%

(weight) aqueous solution of a sodium silicate having a 3.22:1 SiO$_2$:Na$_2$O weight ratio. The resulting plugged honeycombs provided as in this Example 3 are inspected and tested following the procedures described in Example 1, and all of the inspection and testing results are substantially the same.

EXAMPLE 4

Cordierite/Calcium Aluminate—Potassium Silicate Cement

A mixture consisting, in weight percent, of 30% of Kasil® 1 potassium silicate solution, 35% of cordierite powder as described in Example 1, and 35% of a calcium aluminate powder (average particle size 10 microns, commercially available from Lafarge Calcium Aluminates, Chesapeake, Va. 23324) is prepared and thoroughly mixed to provide a cordierite/calcium aluminate-based cementing composition. The cement paste thus provided is similar in handling characteristics to the cement of Example 1, and is similarly charged through a plugging mask into alternating channels of a cordierite ceramic honeycomb of the same geometry and composition as the honeycomb of Example 1.

The silicate/cordierite/calcium aluminate plugs thus provided are dried as described in Example 1, and again produce strong, hard ceramic plugs that are well-bonded and sealed to the channel walls of the cordierite honeycombs. Neither acid leaching in 0.01N aqueous nitric acid nor firing of the plugged honeycombs to 1000° C. to thermally age the plugged structures as described in Example 1 produces any significant deterioration in plug or honeycomb integrity.

While the invention hereinabove set forth has been described with reference to certain specific and detailed embodiments and examples thereof, it will be apparent that those embodiments and examples have been presented for purposes of illustration only, and not for the purpose of circumscribing the invention as it may be practiced within the scope of the appended claims.

We claim:

1. A method for selectively plugging channels of a ceramic honeycomb comprising:
    introducing into respective open transverse cross-sectional areas of selected channels a plastically shapeable cement composition consisting essentially of a blend of a ceramic powder, a water-soluble alkali metal silicate, water and, optionally,
       (i) a reactive salt of a multivalent cation selected from the group consisting of calcium, aluminum, manganese, magnesium, iron, zinc, nickel, chromium and copper, and
       (ii) calcium aluminate; and
    the ceramic powder comprising one or more powders selected from the group consisting of cordierite, clay, talc, alumina, spinel, silicon carbide, silicon nitride, aluminum titanate and mixtures thereof; and
    drying the cement composition to form solid plugs that seal respective transverse cross-sectional areas of the selected channels to provide a pattern of plugged channels.

2. A method in accordance with claim 1 wherein the blend is essentially free of ceramic reinforcing fibers.

3. A method in accordance with claim 1 wherein the alkali metal silicate is potassium silicate.

4. A method in accordance with claim 1 wherein the blend consists essentially of ceramic powder and an alkali metal silicate solution.

5. A method in accordance with claim 1 wherein the ceramic honeycomb is an unfired honeycomb.

6. A method in accordance with claim 5 which comprises the further step of subjecting the unfired ceramic honeycomb and solid plugs to a firing treatment.

7. A method in accordance with claim 1 which comprises the further step of subjecting the ceramic honeycomb and solid plugs to an ion-exchange treatment to extract alkali ions from the plugs.

8. A method in accordance with claim 1 wherein the cement composition contains a reactive salt of a multivalent cation selected from the group consisting of calcium, aluminum, manganese, magnesium, iron, zinc, nickel, chromium and copper.

9. A method in accordance with claim 1 wherein the cement composition contains calcium aluminate.

10. The method of claim 1 wherein a first end of a first channel of the selected channels has an open transverse cross-sectional area, a second end of the first channel is plugged with one of the plugs, a first end of a second channel adjoining the first channel is plugged with another one of the plugs, and a second end of the second channel has an open transverse cross-sectional area, wherein the first end of the first channel and the first end of the second channel are disposed at a first end of the honeycomb, and wherein the second end of the first channel and the second end of the second channel are disposed at a second end of the honeycomb.

11. A method for plugging an unfired ceramic honeycomb body comprising:
    introducing a cement composition into selected channels of the honeycomb body, the composition consisting essentially of a blend of a ceramic powder, a water-soluble alkali metal silicate, water, wherein the ceramic powder comprises one or more powders selected from the group consisting of cordierite, clay, talc, alumina, spinel, silicon carbide, silicon nitride, aluminum titanate and mixtures thereof, wherein the blend optionally includes calcium aluminate and a reactive salt of a multivalent cation selected from the group consisting of calcium, aluminum, manganese, magnesium, iron, zinc, nickel, chromium and copper; and then
    drying the cement composition to form solid plugs that close respective transverse cross-sectional areas of the selected channels to form a pattern of plugged channels.

12. The method of claim 11 wherein, after the drying step, the solid plugs are fired.

13. The method of claim 11 wherein, after the drying step, the solid plugs and the honeycomb body are fired simultaneously.

14. The method of claim 11 wherein a first end of a first channel of the selected channels has an open transverse cross-sectional area, a second end of the first channel is plugged with one of the plugs, a first end of a second channel adjoining the first channel is plugged with another one of the plugs, and a second end of the second channel has an open transverse cross-sectional area, wherein the first end of the first channel and the first end of the second channel are disposed at a first end of the honeycomb, and wherein the second end of the first channel and the second end of the second channel are disposed at a second end of the honeycomb.

15. The method of claim 11 wherein the cement composition passes through a mask and into the selected channels.

16. A method for plugging a fired ceramic honeycomb body comprising:
introducing a cement composition into selected channels of the honeycomb body, the composition consisting essentially of a blend of a ceramic powder, a water-soluble alkali metal silicate, water, wherein the ceramic powder comprises one or more powders selected from the group consisting of cordierite, clay, talc, alumina, spinel, silicon carbide, silicon nitride, aluminum titanate and mixtures thereof, wherein the blend optionally includes calcium aluminate and a reactive salt of a multivalent cation selected from the group consisting of calcium, aluminum, manganese, magnesium, iron, zinc, nickel, chromium and copper; and then
drying the cement composition to form solid plugs that close respective transverse cross-sectional areas of the selected channels to form a pattern of plugged channels.

17. The method of claim 16 wherein, after the drying step, the solid plugs are fired.

18. The method of claim 16 wherein, after the drying step, the solid plugs are not fired.

19. The method of claim 16 wherein a first end of a first channel of the selected channels has an open transverse cross-sectional area, a second end of the first channel is plugged with one of the plugs, a first end of a second channel adjoining the first channel is plugged with another one of the plugs, and a second end of the second channel has an open transverse cross-sectional area, wherein the first end of the first channel and the first end of the second channel are disposed at a first end of the honeycomb, and wherein the second end of the first channel and the second end of the second channel are disposed at a second end of the honeycomb.

20. The method of claim 16 wherein the cement composition passes through a mask and into the selected channels.

* * * * *